T. QUANDT & W. WOLFF.
SAFETY DEVICE FOR STOPPING VEHICLES.
APPLICATION FILED SEPT. 22, 1908.
936,279.
Patented Oct. 5, 1909.
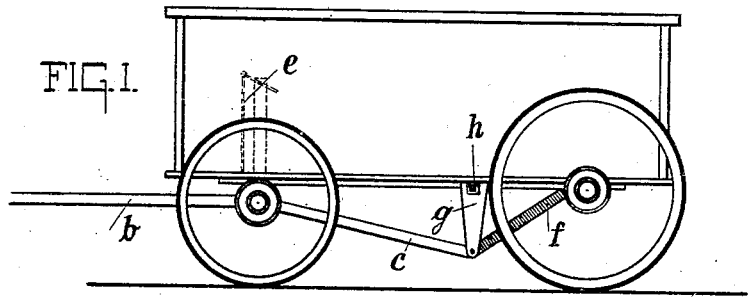
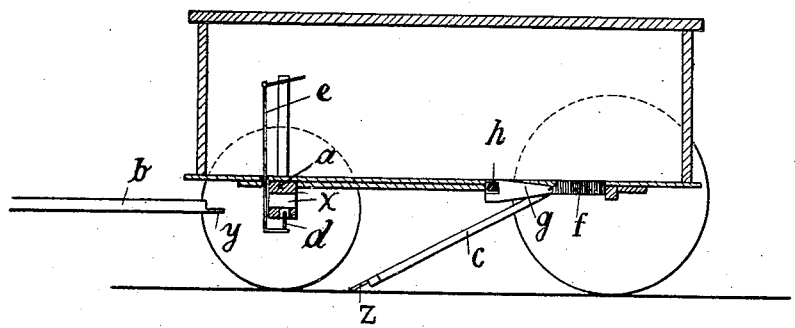
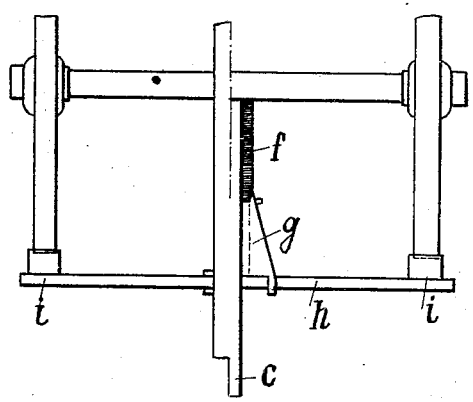
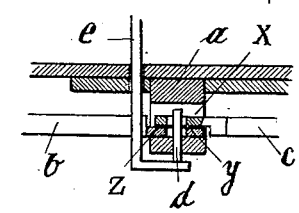
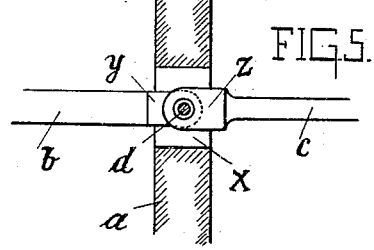

UNITED STATES PATENT OFFICE.

THEODOR QUANDT, OF PORST, POMERANIA, AND WILHELM WOLFF, OF GRÜNEWALD, NEAR NEUSTETTIN, GERMANY.

SAFETY DEVICE FOR STOPPING VEHICLES.

936,279.

Specification of Letters Patent.   Patented Oct. 5, 1909.

Application filed September 22, 1908.   Serial No. 454,252.

*To all whom it may concern:*

Be it known that we, THEODOR QUANDT and WILHELM WOLFF, subjects of the German Emperor, and residents of Porst, in Pomerania, and Grünewald, near Neustettin, respectively, Germany, have invented certain new and useful Improvements in Safety Devices for Stopping Vehicles, of which the following is a specification.

This invention relates to an improved safety-device for stopping vehicles at the bolting of the horses, by which when required the drawing-rod can be quickly disengaged from the vehicle and the latter braked and stopped.

The improved device is shown on the accompanying drawing in which—

Figure 1 is a side view of the same in engaged position, Fig. 2 is a sectional side view of the same in disengaged position the brake blocks being not shown in these two figures for sake of clearness; Fig. 3 shows on a larger scale a plan of the braking mechanism of the device, and Figs. 4 and 5 show in a larger sectional front view and plan respectively, part of the device in engaged position.

In the front axle $a$ of the vehicle a cut-away part $x$ is provided into which projects the rear part of the drawing-rod $b$ with its eye $y$. Together with the drawing-rod the front part of the longitudinal rod $c$ carrying also an eye $z$ is kept in said opening by means of a pin $d$ traversing said eyes and cut-away part from below, said pin being in communication with a system of levers $e$ and through these adapted to be operated from the seat of the vehicle. On the rear axle of the vehicle, a spring $f$ is fixed which with its other end is attached to the link $g$ carrying the rear end of the longitudinal rod $c$. The link $g$ surrounds with its other end a revolubly mounted square braking beam $h$ carrying the two braking blocks $i$ for the rear wheels of the vehicle.

The operation of the device is such that upon a pressure being exerted on the system of levers $e$ from the seat of the vehicle, the pin $d$ being thereby lowered leaves the eyes of the drawing-rod $b$ and longitudinal rod $c$ and thus liberates both the latter. Thereby, the horses are allowed to run away with the drawing-rod $b$ leaving the vehicle behind, while this is stopped by the spring $f$, which was formerly tensioned, rebounding and causing the link $g$ to turn the braking beam for about 90° whereby the breaking blocks $i$ are pressed against the rear wheels of the vehicle, the rod $c$ falling with its front end to the ground.

Having fully described our invention, what we claim and desire to secure by Letters Patent is:

In a vehicle, the combination with the front axle having a cut-away part, the rear axle, and the drawing-rod having at its rear end an eye; of a longitudinal rod having at its front end also an eye, a pin to hold said drawing-rod and longitudinal rod in said cut-away part by passing through the eyes thereof, a system of levers attached to said pin and adapted to be operated from the seat of the vehicle so as to disengage said pin from said drawing-rod and longitudinal rod, a link attached to the rear end of said longitudinal rod, a spring attached with one end to said rear axle and with the other end to said link, a revolubly mounted, square braking beam designed to be surrounded by the free end of said link, and braking blocks on said braking beam for the rear wheels of the vehicle, all for the purpose set forth.

In testimony whereof we have hereunto set our hands in the presence of two subscribing witnesses:

THEODOR QUANDT.
WILHELM WOLFF.

Witnesses:
A. DÖRING,
BENNO BOTTHER.